United States Patent

Thompson

[15] 3,688,252
[45] Aug. 29, 1972

[54] NAVIGATIONAL RECORDING AND DISPLAY AID

[72] Inventor: Donald O. Thompson, 642 Camino Manzanas, Thousand Oaks, Calif. 91360

[22] Filed: Sept. 29, 1970

[21] Appl. No.: 76,424

[52] U.S. Cl. .................................................. 340/24
[51] Int. Cl. ........................................... G08c 21/00
[58] Field of Search..340/23, 24, 25, 26, 27, 112 PT, 340/347 DA; 346/17; 33/141.5; 235/150.2, 150.23, 150.24

[56] References Cited

UNITED STATES PATENTS

| | | |
|---|---|---|
| 3,325,822 | 6/1967 | Heggen et al. ................. 340/24 |
| 3,474,556 | 10/1969 | Scovill ................. 343/112 PT |
| 2,972,742 | 2/1961 | Ross ........................... 340/23 |
| 2,918,343 | 12/1959 | Guillott ....................... 346/17 |
| 3,111,643 | 11/1963 | Van Alstyne et al. ....... 340/23 |
| 3,278,926 | 10/1966 | Wiley et al. ......... 340/347 DA |
| 3,582,955 | 6/1971 | McMurray et al. .......... 346/17 |

*Primary Examiner*—William C. Cooper
*Assistant Examiner*—Thomas L. Kundert
*Attorney*—Robert E. Geauque

[57] ABSTRACT

Herein described is a navigational system which includes apparatus for simultaneously displaying discrete navigational coordinate signals and recording these coordinate signals on a moving memory at predetermined time intervals as the vehicle navigates along a path. Thus, the path is permanently recorded for future use. During or at the end of the vehicle's outgoing voyage, the memory is applied to a display device which may include a transparent map overlay. The discrete coordinate signals are then displayed on the display, displaying the navigational discrete coordinates on the display, so that the operator may steer the vessel over an exact return path. Alternatively, the memory may be used with an appropriate autopilot so that the vessel returns to any point or completely traverses in reverse the initial outgoing course.

3 Claims, 3 Drawing Figures

DONALD O. THOMPSON
INVENTOR.

BY R. E. Geauque
ATTORNEY

3,688,252

NAVIGATIONAL RECORDING AND DISPLAY AID

BACKGROUND OF THE INVENTION

1. Field of the Invention

This invention relates to navigational systems and more particularly to a novel and improved navigational system which develops angle coordinate signals and records them on a memory device for later replay and display and the like.

2. Discussion of the Prior Art

The prior art is replete with navigational system for plotting courses of craft, either water vessels or aircraft. Among these systems many devices and different methods are employed. The most common are velocity meters and compasses which give speed and angular directions. From these components, positions with relation to a given point are always available. Too, the prior art includes systems and methods for compensating for drift due to wind and water currents.

Other methods include the use of radio range finders whereby the vessel tunes radio direction finders by rotating an antenna. This is more precisely done when tuning to two different radio stations at different angular coordinates but a known location. From these known locations the position can be easily calculated to know the exact location of the vessel.

Sometimes a vessel such as a fishing craft desires to retrace its exact course. This may be for many reasons. For example, a fishing craft may want to return to a good fishing spot or return to home harbor. This is not possible with prior art navigational systems unless that system can exactly retrace its previous return course.

The systems now present in the prior art cannot perform this return plotting function, that is, provide a course for the ship to actually retrace its course in order to allow the ship to return over the exact same path.

SUMMARY OF THE INVENTION

Briefly described, the present invention comprises a navigational system useful for plotting and displaying a course of navigation. The system further stores the course during the navigation in a memory for future use and yet is capable of displaying the course if it is desired to retrace that course.

In the embodiment disclosed, means are included for automatically plotting a course for navigation. The means includes means for generating x and y coordinates of the relative position in relation to a given point. The x and y coordinates are then combined with a velocity signal and recorded in a memory system in relation to a time base.

For replay the signals are then displayed on a display which may be a cathode ray tube having an overlay positioned thereon which is a map of the surrounding area in which the vessel is located. Should the display be on a video tape system then the tape can be replayed as the vessel retraces its steps. As the vessel approaches each coordinate recorded a dot will appear on the screen giving a visible indication of the location of the next coordinate. The ship pilot can then adjust his course to correspond to these coordinates. Further, the system can initially display the course during navigation without interruption of the storing process.

Should the ship be equipped with an auto pilot these signals are then fed from the video tape into the auto pilot for exact retracing of the vessel's previous path. The recorded signals then command the auto pilot in its navigation of the vessel.

BRIEF DESCRIPTION OF THE DRAWINGS

These and other features and advantages may become more apparent to those skilled in the art when taken into consideration with the following detailed description wherein like references indicate like and corresponding parts throughout the several views and wherein.

DESCRIPTION OF THE PREFERRED EMBODIMENT

Figure 1:
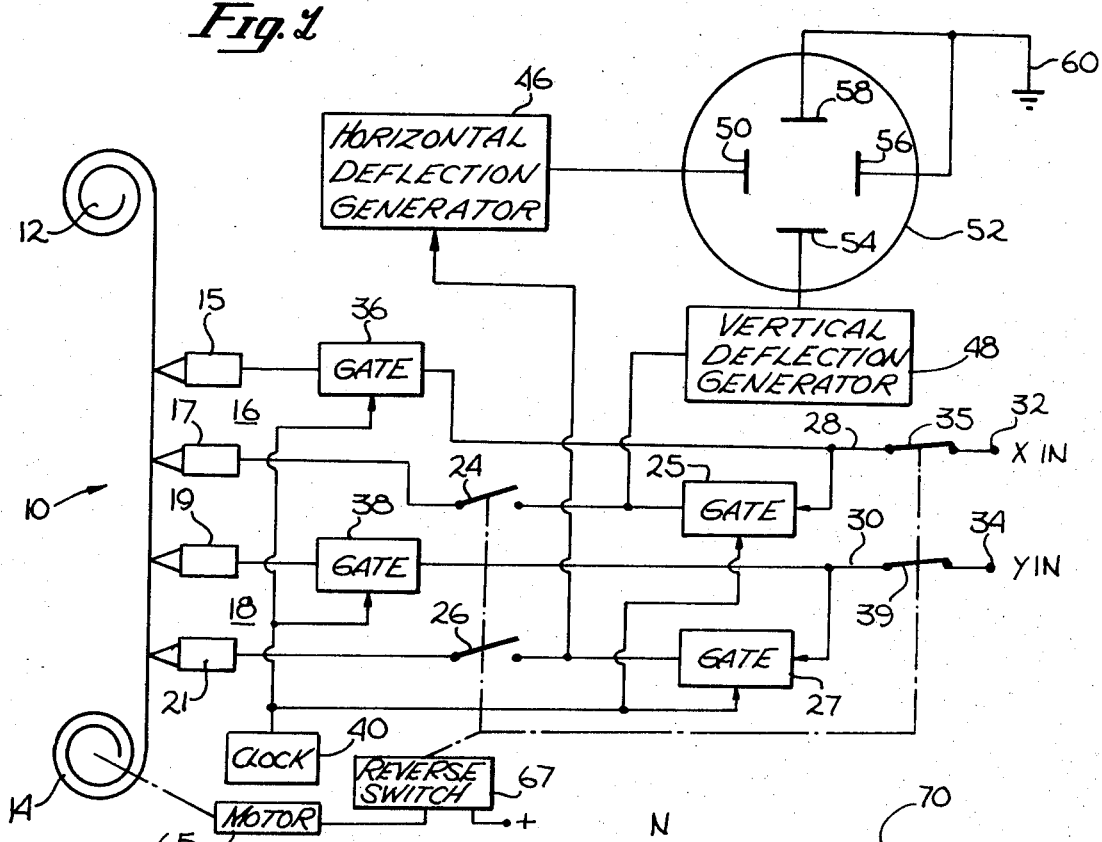
FIG. 1 is a block diagram illustrating but one embodiment of this invention.

Turning now to the drawings, there is shown in FIG. 1 apparatus useful in carrying out this invention. A memory system is shown in the form of a magnetic recording tape 10 which is stored on a pair of tape reels 12 and 14. This type of tape recording system is well known to those skilled in the art and no attempt will be made herein to explain the operation of such systems. A pair of READ/RECORD means 16 and 18 are used in connection with the tape 10 and is used to magnetically record electrical signals thereon in the well known manner. READ/RECORD means 16 comprises a READ head 17 and a RECORD head 15. READ/RECORD means 18 comprises a READ head 21 and a RECORD head 19.

The tape 10 is preferably a two track tape. The READ/RECORD means 16 and 18 are disposed on different tracks on the tape 10 in a side by side relationship.

RECORD head 15 is coupled to an x coordinate input 32 through a gate 36 and a switch 35. READ head 17 is coupled through a switch 24 and a gate 25 to the switch 35 and to coordinate x input 32. RECORD head 19 is coupled through gate 38 and switch 39 to the y coordinate input 34. READ head 21 is coupled through a switch 26 and a gate 27 and through switch 39 to y coordinate input terminal 34.

Lead lines 28 and 30 provide input signals which are indicative of the x and y coordinates of the instantaneous position of the vessel. These signals are applied to the input terminals 32 and 34 and are gated to respective RECORD heads 15 and 19 by the gates 36 and 38. Gates 36 and 38 are simultaneously enabled by clock signals from a clock signal generator 40. Gates 36 and 38 intermittently record instantaneous coordinate signals onto the moving tape 10 at time intervals dictated by the clock signals from clock generator 40. A pair of switches 35 and 39 are ganged together and are normally in the closed position during navigation.

Leads 28 and 30 are also applied to a pair of gates 25 and 27 which are coupled into suitable deflection generators 46 and 48 whereby the output of gate 27 is coupled to the horizontal deflection generator 46 and the output of gate 25 is coupled to the vertical deflection generator 48. The horizontal deflection generator 46 is coupled to the horizontal deflection plate 50 of cathode ray tube (CRT) 52. The vertical deflection generator 48 is coupled to the vertical deflection plate 54 of CRT 52. Opposing plates 56 and 58 are coupled to a ground reference 60.

When the vessel to which the above equipment is coupled is navigating in a normal course switches 35 and 39 are normally closed applying the signals on terminal 32 and 34 to the inputs to gates 36 and 38 respectively. When gates 36 and 38 are enabled by clock 40 increments of the signals are applied to RECORD heads 19 and 15 where they are recorded on the tape 10. Further the signals on terminals 32 and 34 are applied to gates 25 and 27 respectively. Gates 25 and 27 are enabled by clock 40 whereby the real time coordinates are applied to cathode ray tube 52 where they are displayed. If it is desired to retrace the exact course the switches 24 and 26 are switched to couple the READ heads 17 and 21 to the horizontal and deflection generators 46 and 48 respectively. The direction of the tape is changed and the recorded signals are then applied to deflection generators 46 and 48 whereby discrete display dots are displayed on the cathode ray tube. A drive motor 65 is mechanically coupled to the tape 10 to cause it to rotate at its desired speed. A reversing switch 67 reverses the direction of the motor. Thus on replay the operator engages the reversing switch 67 which opens switches 35 and 39 and closes switches 24 and 26. Also switch 67 reverses the direction of motor 67. Thereafter the signals indicative of $x$ and $y$ coordinates emanate from the tape 10.

Figure 2:
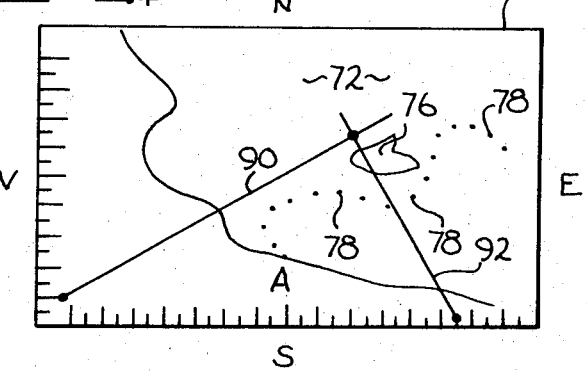
FIG. 2 is a plan view of the display unit and map overlay used in conjunction with the embodiment set forth in FIG. 1.

With reference now to FIG. 2 there is shown a map overlay 70 which for illustrative purposes includes a body of water 72 which may simply be a transparent area, a shore line 74 and an island 76. The map overlay 70 is then disposed over the display screen of the CRT 52. The displayed signals then appear as bright dots 78. The overlay may then include graphs on its $x$ and $y$ (north south and east west) coordinates so that the observer may plot his return course. A series of overlay maps may be provided for each area navigated by the vessel and may correspond with the tape area used.

Figure 3:
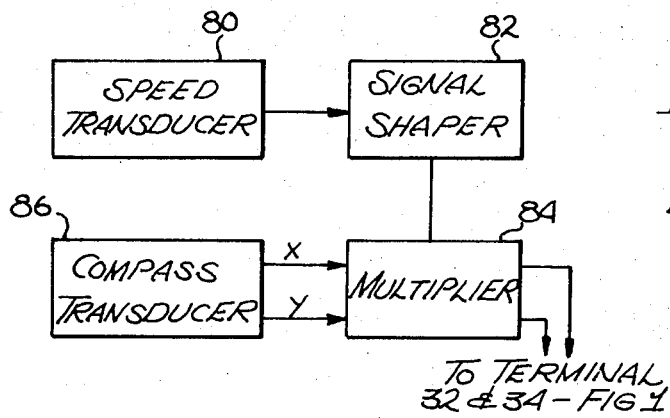
FIG. 3 is a block diagram illustrating an embodiment for generating x and y coordinate signals for applying to the instrument set forth in FIG. 1.

There are numerous acceptable ways to generate the $x$ and $y$ coordinates to be applied to the terminals 32 and 34 respectively. For example, with reference to FIG. 3 there is shown a speed transducer 80 which measures the velocity of the vessel through water. A signal indicative of the velocity is generated therein and shaped in a signal shaper 82 and applied to a multiplier 84. A compass transducer 86 generates $x$ and $y$ coordinate signals in a suitable manner and applies these signals into the multiplier 84. There the speed signal is multiplied by the compass $x$ and $y$ signals and applied to the input terminals 32 and 34 of FIG. 1.

Since the basic purpose of the above described instrument is to record position with respect to a given initial point and then to store this information on the tape 10 for subsequent playback on the video display, it is necessary to measure both distance and direction from that initial point. The distance and direction information is thus generated in the speed transducer 80 and compass direction transducer 86 aforesaid. Taking a unit time base generated in clock generator 40, the information from speed transducer 80 is transformed into distance information and then resolved into horizontal and vertical components for a rectangular coordinate display in the $x$ and $y$ multiplier 84. In order to do this the compass direction transducer 86 is designed to measure the vessels heading in the usual compass units of degrees, and then generate voltages proportional to the sine and cosine of the direction angle.

At predetermined intervals the time base signals generated by clock generator 40 enables the gates 36 and 38 so that the voltages proportional to the $x$ and $y$ coordinates and proportional to direction and distance that the vessel has traveled within the time interval are recorded and stored on tape 10.

The memory unit is thus designed that the information added in any one time interval is algebraically added to all previously stored points; thus any one point in the memory unit represents the position of the vessel at any time with respect to the initial point.

As shown in FIG. 2 the display unit is a visual presentation of all points that have been recorded on the course of the vessel. In FIG. 2 it can be seen that the vessel starts at point A and then follows the path shown by the series of dots 78. The series of chart overlays provided provide for the presentation scheme which correspond to the selected area of navigation. Thus the vessels position with respect to standard charts will be given at any and all times. The instrument may be calibrated so that charts with different mileage scales may be used in accordance with this invention. Thus the described embodiment provides a direct map for return to any point on the trajectory regardless of fog or other weather conditions.

It should be understood that other types of instruments may be used to develop coordinate signals. For example two radio direction signals may be used in place of the speed and distance transducers 80 and 86. A position having increased precision is then obtained since drift due to wind and sea currents is no longer a factor. Thus the speed and distance transducers 80 and 86 may be eliminated and replaced by suitable range finder equipment to obtain radio signals indicative of the $x$ and $y$ coordinates and apply them to the memory unit. For example, a given radio station A is located at one location and is detected on a line 90 from the vessel position at point B. A second station C is located at a different location and is detected on a line 92 from the vessel's position B. These coordinates are continuously displayed and recorded in the manner heretofore set forth.

The course and position information developed during any trajectory and stored on the tape 10 can be played back and applied to any auto pilot through appropriate interface units. Thus it is possible to "play a record" back to the vessels auto pilot and return exactly to the starting point thereof.

Having thus described preferred embodiments of this invention what is claimed is:

1. Navigational coordinate information system for storing incremental coordinate information for use in return navigation of a vessel, said system including:
   generating means for generating $x$ and $y$ coordinates signals indicative of direction and distance of a vessel;
   a dual track moving storage means having a first track and a second track for storing the $x$ and $y$ coordinate signals of said generating means;

a first pair of READ/RECORD heads, said first pair of heads engaging said first track of said storage means;

a second pair of READ/RECORD heads, said second pair of READ/RECORD heads being adapted to engage said second track of said storage means;

drive means for driving said storage means to move in a first direction and a second direction relative to said READ/RECORD heads;

a clock generating means for generating clock signals;

a first RECORD gating means being coupled between the RECORD head of said first pair of READ/RECORD heads and said generating means and being coupled to said clock generating means to be enabled thereby for storing $x$ coordinate signals on the first track of said storage means at each clock signal while said storage means moves past said READ/RECORD heads in the first direction;

a second RECORD gating means being coupled between the RECORD head of said second pair of READ/RECORD heads and said generating means and being coupled to said clock generating means to be enabled thereby for storing $y$ coordinate signals on the second track of said storage means at each clock signal while said storage means moves past said READ/RECORD head in the first direction;

A cathode ray display means having a visual display screen and having first and second deflection inputs means, said first deflection input means being coupled to said READ head of said first pair READ/RECORD heads, said second deflection input means being coupled to said READ head of said second pair of READ/RECORD heads; and a switching means for switching said generating means from said first and second RECORD heads and for switching said first and second READ heads to the input means of said first and second deflection means respectively of said cathode ray display means, said switching means including means coupled to said drive means for changing the direction of said moving storage means to said second direction whereby the stored coordinates are read from said storage means displayed on the visual display screen of said cathode ray display means.

2. The navigational coordinate information system as defined in claim 1, wherein said generating means being coupled to the input means of said cathode ray display so that said coordinates may be displayed simultaneous with being stored.

3. The navigational coordinate information system as defined in claim 1 and further including a transparent map overlay adopted to be placed over the visual screen of said cathode ray tube and being coordinated with the area location relative to the stored coordinates.

* * * * *